United States Patent
Jung et al.

(10) Patent No.: US 11,927,166 B2
(45) Date of Patent: Mar. 12, 2024

(54) CONTROL METHOD AND CONTROL DEVICE FOR INTERNAL COMBUSTION ENGINE

(71) Applicants: NISSAN MOTOR CO., LTD., Yokohama (JP); RENAULT S.A.S., Boulogne-Billancourt (FR)

(72) Inventors: Jooyong Jung, Kanagawa (JP); Yuzuru Tohta, Kanagawa (JP); Ryouichi Ootaki, Kanagawa (JP); Tetsuya Nishiyama, Kanagawa (JP); Charlotte Giordano, Courtaboeuf (FR); Tony De-Oliveira, Courtaboeuf (FR)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/028,705

(22) PCT Filed: Sep. 28, 2020

(86) PCT No.: PCT/IB2020/000804
§ 371 (c)(1),
(2) Date: Mar. 27, 2023

(87) PCT Pub. No.: WO2022/064237
PCT Pub. Date: Mar. 31, 2022

(65) Prior Publication Data
US 2024/0026848 A1    Jan. 25, 2024

(51) Int. Cl.
*F02P 5/15* (2006.01)

(52) U.S. Cl.
CPC ................................. *F02P 5/1504* (2013.01)

(58) Field of Classification Search
CPC ................................. F02P 5/1504; F02P 5/15
See application file for complete search history.

(56) References Cited

FOREIGN PATENT DOCUMENTS

JP    2018-168791 A    11/2018

*Primary Examiner* — Jacob M Amick
*Assistant Examiner* — Charles J Brauch
(74) *Attorney, Agent, or Firm* — Foley & Lardner LLP

(57) ABSTRACT

A control method is provided for an internal combustion engine which includes a turbocharger, and which is connected to a stepped automatic transmission. The control method includes judging whether or not an upshift of the automatic transmission is performed; performing a first torque down control by an ignition timing retard of the internal combustion engine during the upshift; judging whether or not a predicted torque estimated from a driving condition of the internal combustion engine is greater than a target torque at an end of the upshift; and performing a second torque down control by the ignition timing retard of the internal combustion engine when the predicted torque is greater than the target torque.

10 Claims, 5 Drawing Sheets

CONTROL METHOD AND CONTROL DEVICE FOR INTERNAL COMBUSTION ENGINE

TECHNICAL FIELD

This invention relates to a control for an internal combustion engine which includes a turbocharger, and which is connected to a stepped automatic transmission, and more specifically to a control method and a control device which are configured to perform a torque down control (torque reduction control) by an ignition timing retard during an upshift.

BACKGROUND ART

In an internal combustion engine including a stepped automatic transmission, in general, a torque down control to temporarily suppress a torque of the internal combustion engine is performed at an upshift (a shift to a high speed stage) of the automatic transmission so as to decrease a shock at the shift. This torque down control can be performed, for example, by an ignition timing retard.

A patent document 1 discloses an internal combustion engine which includes a turbocharger, and in which an opening degree of a waste gate valve of the turbocharger is increased when the ignition timing retard is performed as the torque down control at the upshift. This is performed in consideration of the following. An exhaust gas temperature of the internal combustion engine becomes high in accordance with the ignition timing retard. With this, the increase of the exhaust pressure on the upstream side of the turbine is generated. Consequently, the increase of the supercharging pressure is generated.

However, in this control, the opening degree of the waist gate valve becomes large during the upshift. Accordingly, when the driver requests the acceleration immediately after the upshift, the supercharging pressure is increased after the waist gate valve is closed, so that the acceleration response is decreased.

PRIOR ART DOCUMENT

Patent Document

Japanese Patent Application Publication No. 2018-168791

SUMMARY OF THE INVENTION

A control method for an internal combustion engine according to the present invention, the control method comprises:
 judging whether or not an upshift of the automatic transmission is performed;
 performing a first torque down control by an ignition timing retard of the internal combustion engine during the upshift;
 judging whether or not a predicted torque estimated from a driving condition of the internal combustion engine is greater than a target torque at an end of the upshift; and
 performing a second torque down control by the ignition timing retard of the internal combustion engine when the predicted torque is greater than the target torque.

In the internal combustion engine including the turbocharger, the exhaust gas temperature becomes high due to the ignition timing retard for the torque down during the upshift. Accordingly, the supercharging pressure tends to be increased. When the ignition timing retard is finished in accordance with the end of the upshift, the torque may temporarily become excessive. In the present invention, when this excessive torque is predicted, the second torque down control by the ignition timing retard is additionally performed.

With this, the generation of the excessive torque is suppressed without increasing the opening degree of the waist gate valve. Accordingly, when the acceleration is requested immediately after the upshift, it is possible to rapidly attain the increase of the supercharging pressure, and to improve the acceleration response.

DESCRIPTION OF EMBODIMENTS

Hereinafter, one embodiment of the present invention is explained in detail with reference to the drawings.

Figure 1:
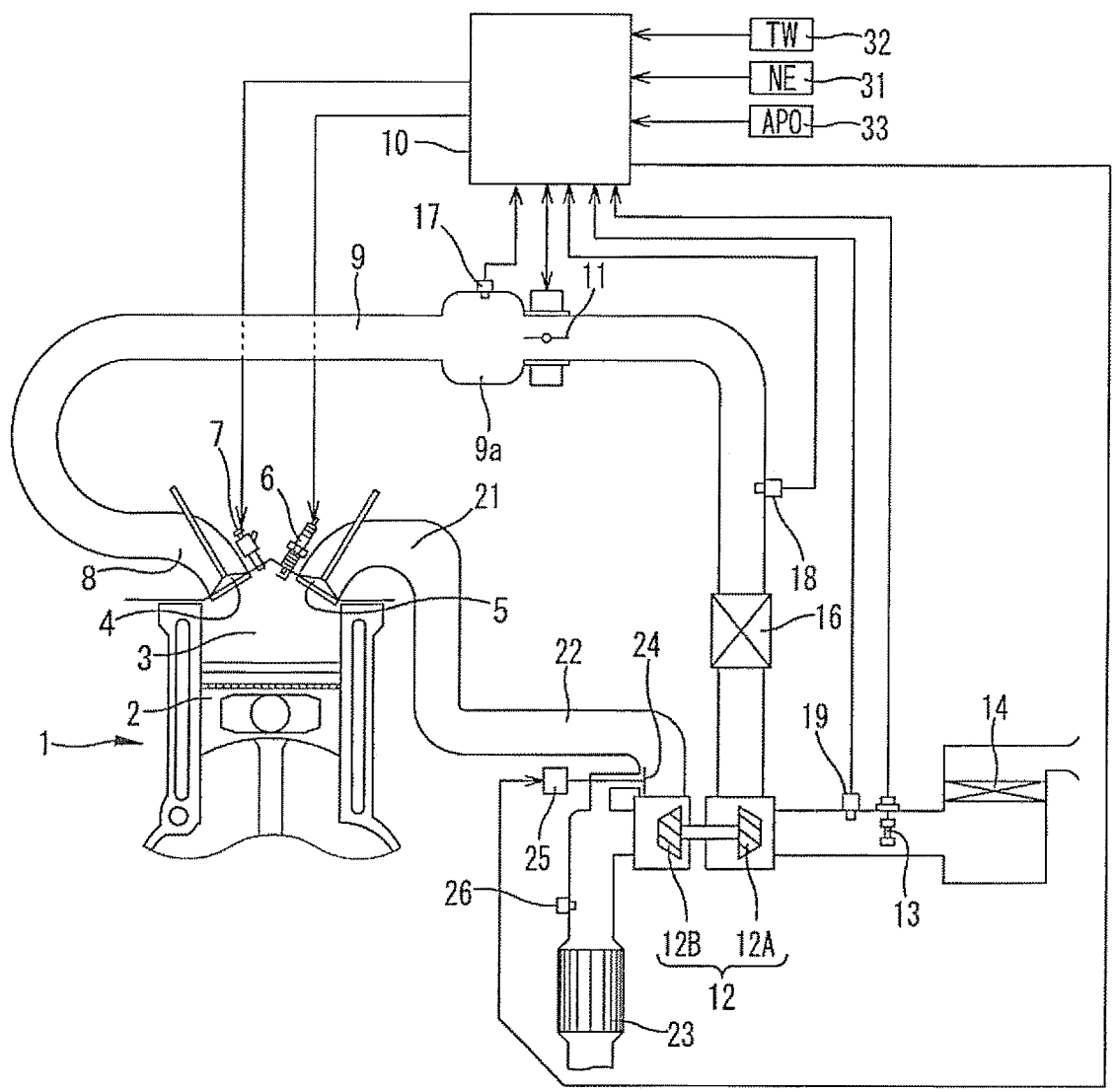
FIG. 1 is an explanation view schematically showing a system configuration of a supercharging internal combustion engine for a vehicle.

FIG. 1 is an explanation view showing a schematic configuration of a supercharging internal combustion engine 1 for a vehicle to which a control according to the one embodiment of the present invention is applied. The internal combustion engine 1 is mounted on the vehicle with a stepped automatic transmission (not shown).

The internal combustion engine 1 is, for example, a four-stroke cycle spark ignition type internal combustion engine 1 configured to use, for example, the gasoline as the fuel. The internal combustion engine 1 includes a pair of intake valves 4 and a pair of exhaust valves 5 which are disposed on a ceiling wall surface of a combustion chamber 3 formed by a piston 2; and a spark plug 6 and a fuel injection valve 7 which are disposed at a central portion surrounded by these intake valves 4 and exhaust valves 5.

The fuel injection valve 7 is an electromagnetic or piezoelectric injection valve configured to be opened by being applied with a drive pulse signal. The fuel injection valve 7 is configured to inject the fuel substantially proportional to a pulse width of the drive pulse signal, into a cylinder. Besides, in the present invention, the internal combustion engine 1 may be a port injection type engine configured to inject the fuel into an intake port 8 on the upstream side of the intake valve 4.

An electric control type throttle valve 11 is disposed on the upstream side of a collector portion 9a of the intake passage 9 connected to the intake port 8. An opening degree of the electric control type throttle valve 11 is controlled by a control signal from an engine controller 10. A compressor 12A of a turbocharger 12 is disposed on the upstream side of the electric control type throttle valve 11. An air flow meter 13 configured to sense an intake air amount, and an air cleaner 14 are disposed on the upstream side of the compressor 12A. An intercooler 16 is provided between the compressor 12A and the throttle valve 11. An intake pressure sensor 17 configured to sense the intake pressure is provided to the collector portion 9a. Moreover, a supercharging pressure sensor 18 configured to sense an outlet pressure (that is, the supercharging pressure) of the compressor 12A is disposed between the intercooler 16 and the throttle valve 11. Furthermore, a temperature and pressure sensor 19 configured to sense an atmospheric temperature and an atmospheric pressure is provided on an upstream side of the compressor 12A.

On the other hand, a turbine 12B of the turbocharger 12 is disposed at an exhaust passage 22 connected to an exhaust port 21 configured to be opened and closed by the exhaust valve 5. A catalyst 23 made of a three-way catalyst is disposed on the downstream side of the turbine 12B. A waist gate valve 24 is provided at an inlet portion of the turbine 12B. The waist gate valve 24 is configured to guide a part of the exhaust gas by bypassing the turbine 12B so as to control the supercharging pressure. This waist gate valve 24 is an electronic control type configuration in which an opening degree of the waist gate valve 24 is controlled by an electric actuator 25.

An air fuel ratio sensor 26 configured to sense an exhaust gas air fuel ratio is provided on the inlet side of the catalyst 23. Besides, the catalyst 23 is shown as one catalyst in the drawing. However, in general, the catalyst 23 is constituted by a pre-catalyst positioned within an engine room of the vehicle, and a main catalyst positioned below a floor of the vehicle.

An engine controller 10 is configured to control the fuel injection amount and the injection timing of the fuel injection valve 7, the ignition timing of the spark plug 6, and so on, in addition to the control of the opening degree of the throttle valve 11. Similarly, the engine controller 10 is configured to perform the air fuel ratio control by using the air fuel ratio sensor 26.

Moreover, the engine controller 10 is configured to control the opening degree of the waist gate valve 24, and thereby to control the supercharging pressure, and consequently the torque of the internal combustion engine 1. Basically, the torque of the internal combustion engine 1 is controlled by the opening degree control of the throttle valve 1 in the non-supercharging region in which the request torque is relatively small. The torque of the internal combustion engine 1 is controlled by the opening degree control of the waist gate valve 24 in the supercharging region in which the request torque is relatively large, and in which the throttle valve 11 is fully opened.

The engine controller 10 receives, as the input signals, the detection signals of the air flow meter 13, the intake pressure sensor 17, the supercharging pressure sensor 18, the temperature and pressure sensor 19, and the air fuel ratio sensor 26. Moreover, the engine controller 10 receives detection signals of a crank angle sensor 31 configured to sense an engine speed NE, a water temperature sensor 32 configured to sense a cooling water temperature TW, an accelerator opening degree sensor 33 configured to sense an accelerator opening degree vAPO according to a depression of an accelerator pedal by a driver, and so on.

Moreover, the engine controller 10 receives information relating to a present shift stage CURGP and a target shift stage of NEXTGP of the automatic transmission from a transmission controller (not shown). The automatic transmission includes a plurality of planetary gear mechanisms, and a plurality of frictional engagement mechanisms (clutches and brakes) configured to engage and disengage constituting elements of the planetary gear mechanisms. For example, the automatic transmission is shifted in accordance with a predetermined shift diagram in which the vehicle speed VSP and the accelerator opening degree vAPO are used as parameters.

At the shift of this automatic transmission, specifically, at the upshift at which the shift stage is shifted to the high speed stage side, the engine controller 10 is configured to perform a torque down control (first torque down control, first torque reduction control) by the ignition timing retard so as to suppress the shock according to the shift, as described later. Moreover, the increase of the opening degree of the waist gate valve 24 for the torque down is not performed at the upshift. That is, the upshift of the automatic transmission is performed while the waist gate valve 24 is basically held to the fully closed state, or a partially open state according to the request torque.

In this case, in the internal combustion engine 1 including the turbocharger 12, the exhaust gas temperature becomes high due to the ignition timing retard for the torque down. Accordingly, the supercharging pressure tends to be increased. Therefore, when the ignition timing retard is finished in accordance with the end of the upshift, the torque may become excessive temporarily. In particular, when the ignition timing retard is performed in a state in which the waste gate valve 24 is closed, the increase of the supercharging pressure according to the increase of the exhaust gas temperature becomes remarkable. Accordingly, in this embodiment, in a case in which it is predicted that the torque becomes excessive in this way, a second torque down control (second torque reduction control) by the ignition timing retard is additionally performed.

In the example shown in the drawing, the engine controller 10 constitutes a "shift judging section", a "torque predicting section", and a "torque down control section" in claims.

Figure 2:
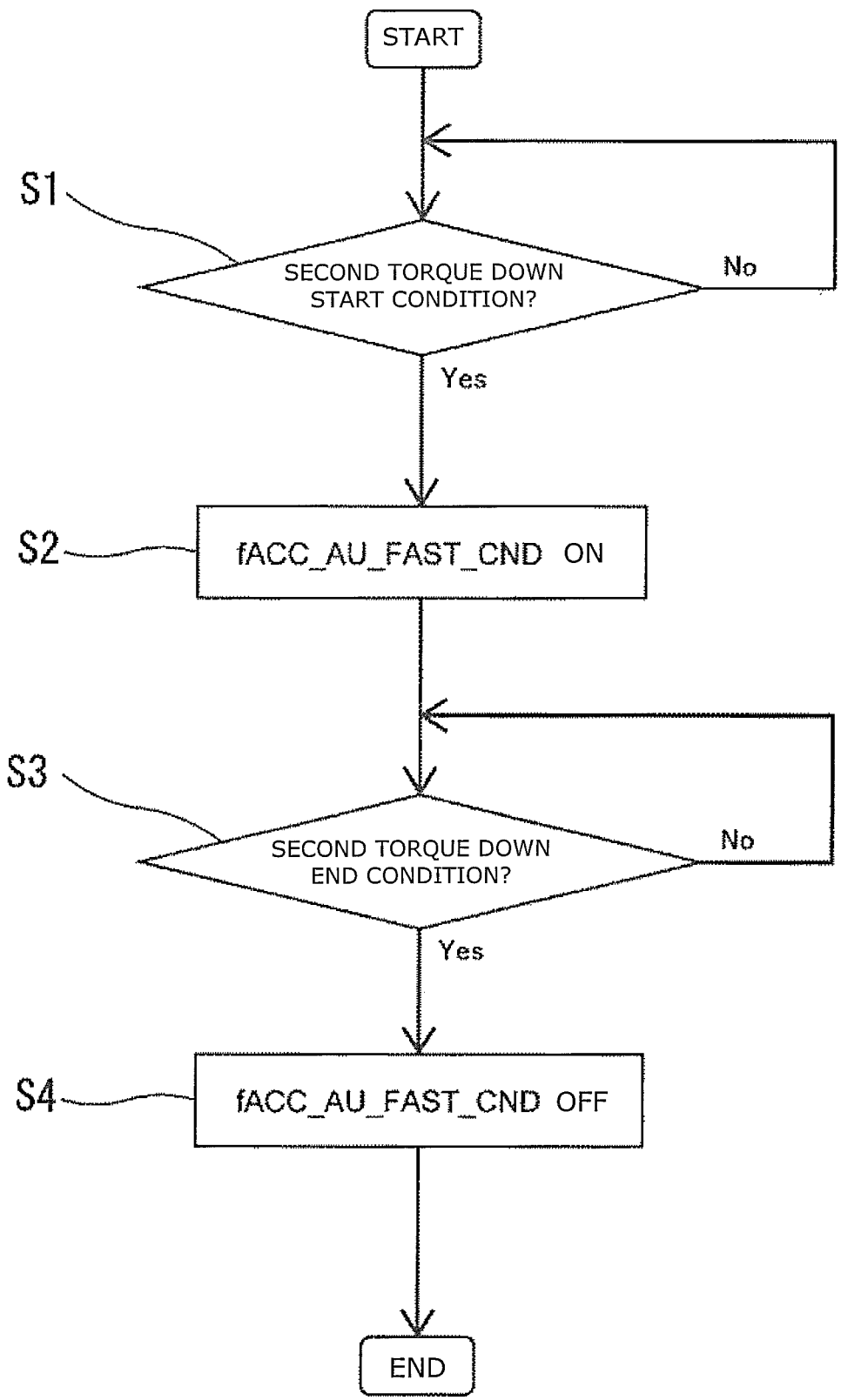
FIG. 2 is a flowchart showing a flow of a process of a second torque down control.
Figure 3:
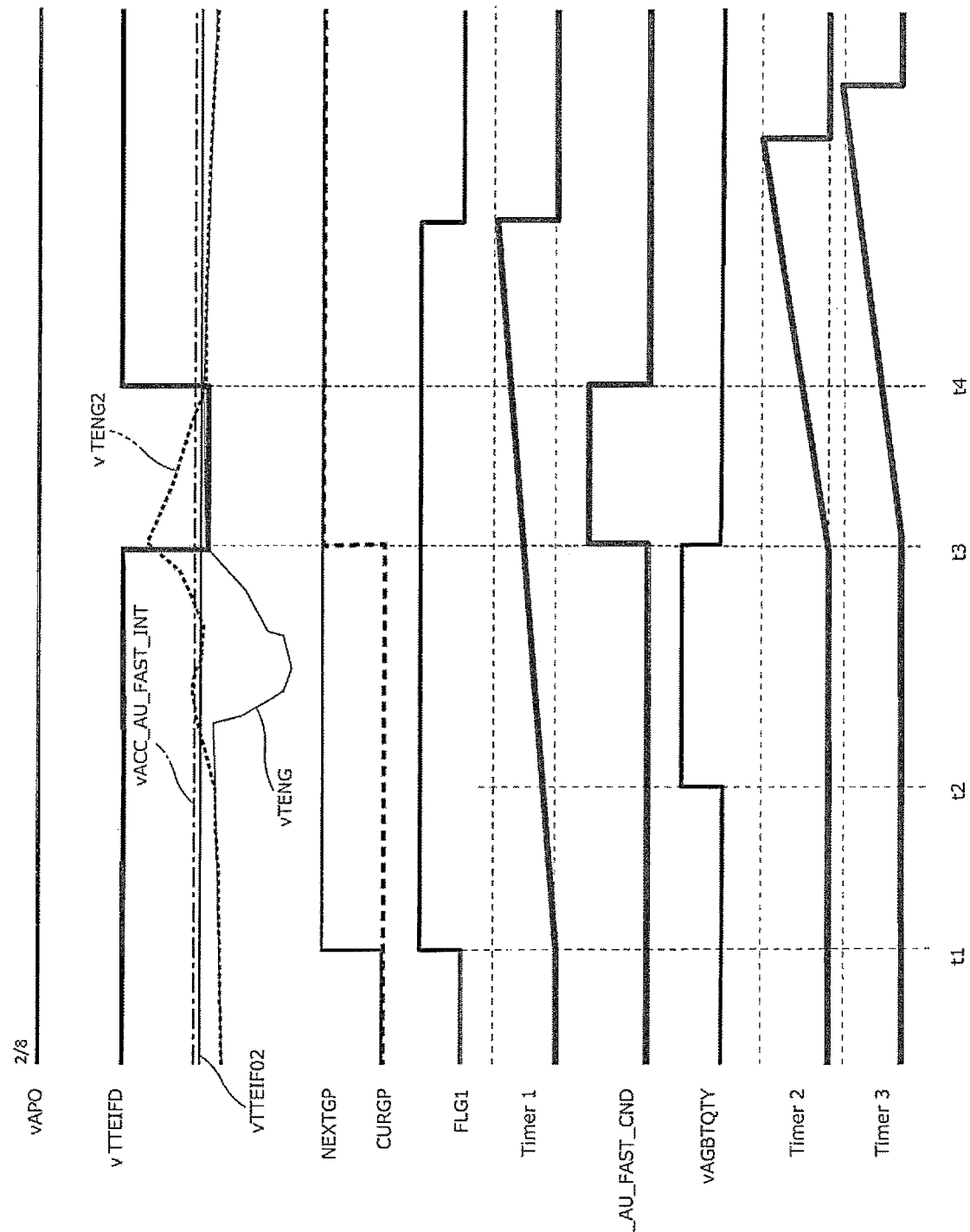
FIG. 3 is a time chart in one example in which an accelerator opening degree is constant.

FIG. 2 is a flowchart showing a flow of a process of a start and an end of the second torque down control after the end of the upshift of the automatic transmission. Moreover, FIG. 3 is a time chart showing variations of various signals or various parameters when the upshift is performed, for example, while the accelerator opening degree vAPO is held to the relatively small constant opening degree (for example, ⅖). For example, the upshift is performed by crossing the predetermined shift line in accordance with the increase of the vehicle speed VSP. Hereinafter, the time chart of FIG. 3 is explained with reference to the flowchart of FIG. 2.

The signals or the parameters in FIG. 3 are explained in order from the upper side. "vAPO" represents the accelerator opening degree by the operation of the driver. In the example of FIG. 3, vAPO is constant, for example, "⅖". "vTTEIFD" represents the target engine torque reflecting the second torque down control. As shown in the drawing, vTTEIFD is stepwisely varied in accordance with the second torque down control. "vTTEIF02" is the target engine torque according to the request of the driver, that is, the target torque calculated from the accelerator opening degree vAPO. "vACC_AU_FAST_INT" represents an end judgment torque which is a criteria for finishing the second torque down control, for example, when the accelerator opening degree vAPO is decreased in the middle of the control. vACC_AU_FAST_INT is a value obtained by storing and holding the value of the target torque vTTEIF02 at the start point of the second torque down control. Besides, in FIG. 3, "vACC_AU_FAST_INT" is not equal to "vTTEIF02" in consideration of the visibility of the drawings. However, actually, "vACC_AU_FAST_INT" is equal to "vTTEIF02". "vTENG2" represents the engine torque estimated from the intake air amount of the internal combustion engine 1, that is, a predicted torque. The influence of the first and second torque down controls are not reflected to this predicted torque vTENG2. "vTENG" represents the actual engine torque of the internal combustion engine 1. The influence of the first and second torque down controls are reflected to "vTENG".

"NEXTGP" represents the target shift stage. "CURGP" represents the present shift stage. In a case in which "NEXTGP" is different from "CURGP", the shift from the present shift stage CURGP to the target shift stage NEXTGP (the upshift in FIG. 3) is required.

"FLG1" is a flag representing a period during which the second torque down control is permitted. "Timer1" is a timer for performing the reset of the flag FLG1. That is, the flag FLG1 becomes ON when the upshift is requested (NEXTGP>CURGP). Simultaneously, the timer Timer1 is started. As shown in FIG. 3, the flag FLG1 becomes OFF when the Timer1 reaches a predetermined value.

"fACC_AU_FAST_CND" is a flag representing that the second torque down control is being performed. This flag fACC_AU_FAST_CND is set by AND conditions which are some conditions, as described below. With this, the ignition timing retard as the second torque down control is started. Moreover, this flag fACC_AU_FAST_CND is reset by OR conditions which are some conditions. With this, the second torque down control by the ignition timing retard is finished.

"vAGBTQTYP" is a flag representing that the first torque down control is being performed. This flag vAGBTQTYP is set when the actual shift reaches a predetermined phase after the upshift is requested. This flag vAGBTQTYP is reset when the shift is finished. The ignition timing retard as the first torque down control is performed while this flag vAGBTQTYP is ON.

"Timer2" is a timer for determining an elapsed time period which is one of the end conditions of the period of the second torque down control. This timer Timer2 is started when the shift (the upshift) is finished, and when the request of the first torque down control is disappeared. The timer Timer2 is counted up when timer Timer2 reaches a predetermined value. When the second torque down control is continued during the long time period, the second torque down control is forcibly finished by the count-up of this timer Timer2.

"Timer3" is a timer for restricting the period of the second torque down control for protecting the catalyst. This timer Timer3 is started when the second torque down control is started. This timer Timer3 is counted up when timer Timer3 reaches a predetermined value. The ignition timing retard as the second torque down control is forcibly finished in accordance with the count-up of the timer Timer3.

Besides, the setting times of the timers Timer1, Timer2, and Timer3 may be different from each other. In the example of FIG. 3, the setting time of the timer Timer1 is longest. The setting time of the timer Timer2 is shortest.

A routine represented in the flowchart of FIG. 2 represents a process of the start and the end of the second torque down control performed after the first torque down control according to the upshift is finished. At step 1, it is judged whether or not the start condition of the second torque down control is satisfied. When the start condition is not satisfied, the second torque down control is not performed.

When the start condition is satisfied, the process proceeds to step 2. The flag fACC_AU_FAST_CND for the second torque down control is set. With this, the ignition timing retard as the second torque down control is performed.

The start condition of the second torque down control is following four AND conditions.
1. The upshift is finished.
2. The predicted torque vTENG2 is equal to or greater than the target torque vTTEIF02 by the predetermined torque.
3. A time period from the start of the upshift is smaller than the predetermined time period. That is, the FLG1 is ON.
4. There is no retard request from the transmission side. That is, the ignition timing retard as the first torque down control is finished.

When these four conditions are satisfied at the same time, the start condition is satisfied.

Besides, the retard amount of the ignition timing retard in the second torque down control may be constant. However, it is preferable that the retard amount is set in accordance with the difference between the predicted torque vTENG2 and the target torque vTTEIF02.

After the start of the second torque down control, it is repeatedly judged whether or not the end condition of the second torque down control is satisfied at step 3. When the end condition is not satisfied, the second torque down control is continued. When the end condition is satisfied, the process proceeds to step 4. The flag fACC_AU_FAST_CND is reset. With this, the ignition timing retard as the second torque down control is finished.

The end condition is following four OR conditions.
1. The timer Timer2 is counted up. That is, a certain time period is elapsed after the shift (the upshift) is finished, and after the request of the first torque down control is disappeared.
2. The difference between the predicted torque vTENG2 and the target torque vTTEIF02 becomes equal to or smaller than the predetermined value.
3. The difference between the predicted torque vTENG2 and the end judgment torque vACC_AU_FAST_INT becomes equal to or smaller than the predetermined value.
4. The timer Timer3 is counted up. That is, the certain time period is elapsed from the start of the second torque down control.

When one of these four conditions is satisfied, the end condition is satisfied.

Besides, "the predetermined value" in the second condition may be identical to "the predetermined value" in the third condition. "The predetermined value" in the second condition may be different from "the predetermined value" in the third condition.

Next, the example of the time chart of FIG. 3 is explained. As described above, FIG. 3 is the example in which the accelerator opening degree vAPO is maintained to the constant value. In this FIG. 3, the upshift request is set at time t1 (NEXTGP>CURGP). The flag FLG1 becomes ON. The timer Timer1 is started. Then, at time t2 at which the actual shift reaches the predetermined phase, the flag vAGBTQTYP relating to the first torque down control becomes ON. With this, the ignition timing retard as the first torque down control is started. Besides, the retard amount of the ignition timing retard in the first torque down control is set, for example, in accordance with a speed difference between the input side rotation speed and the output side rotation speed of the clutch in the automatic transmission. By this first torque down control, the shock by the shift is decreased.

The first torque down control is finished at time t3 in accordance with the end of the shift. The waist gate valve 24 of the turbocharger 12 is maintained to a fully closed state (or a partially closed state) during this first torque down control. Accordingly, the supercharging pressure becomes relatively high by the increases of the exhaust gas temperature and the exhaust pressure in accordance with the ignition timing retard. The predicted torque vTENG2 at time t3 which is estimated from the intake air amount becomes high. Accordingly, at time t3, the predicted torque vTENG2 becomes equal to or greater than the target torque vTTEIF02 by the predetermined torque. In the example of FIG. 3, the other three conditions which are the start condition of the second torque down control are satisfied. Accordingly, the start condition which is the four AND conditions is satisfied. The flag fACC_AU_FAST_CND for the second torque down control becomes ON. With this, the ignition timing retard as the second torque down control is performed. By this second torque down control, the actual torque vTENG is varied along the target torque vTTEIF02 corresponding to the request of the driver even when the predicted torque vTENG2 is high.

The timer Timer3 is started in accordance with the start of the second torque down control. Moreover, the timer Timer2 is started since the upshift is finished, and the first torque down control is finished.

Then, in this example of FIG. 3, the difference between the predicted torque vTENG2 and the target torque vTTEIF02 becomes equal to or smaller than the predetermined torque at time t4. Accordingly, the flag fACC_AU_FAST_CND is reset in accordance with the satisfaction of one of the end conditions which are the above-described OR conditions. With this, the ignition timing retard as the second torque down control is finished.

Besides, in the example of FIG. 3, both of the timer Timer2 and the timer Timer3 do not reach the predetermined values at time t4. Accordingly, these are not acted as the end conditions. In a case in which the timing at which the difference between the predicted torque vTENG2 and the target torque vTTEIF02 becomes equal to or smaller than the predetermined torque is later than the count-up of the timer Timer2 or the timer Timer3, the second torque down control is finished by the function of the timer Timer2 or the timer Timer3.

In this way, in this embodiment, when the predicted torque vTENG2 is excessive with respect to the target torque vTTEIF02 at the end of the first torque down control, the second torque down control is performed. Accordingly, even when the waist gate valve 24 of the turbocharger 12 is fully closed, the actual torque vTENG does not become excessive. Accordingly, it is unnecessary to positively open the waist gate valve 24 during the first torque down control. For example, when the acceleration is requested immediately after the upshift, it is possible to rapidly increase the supercharging pressure.

Figure 4:
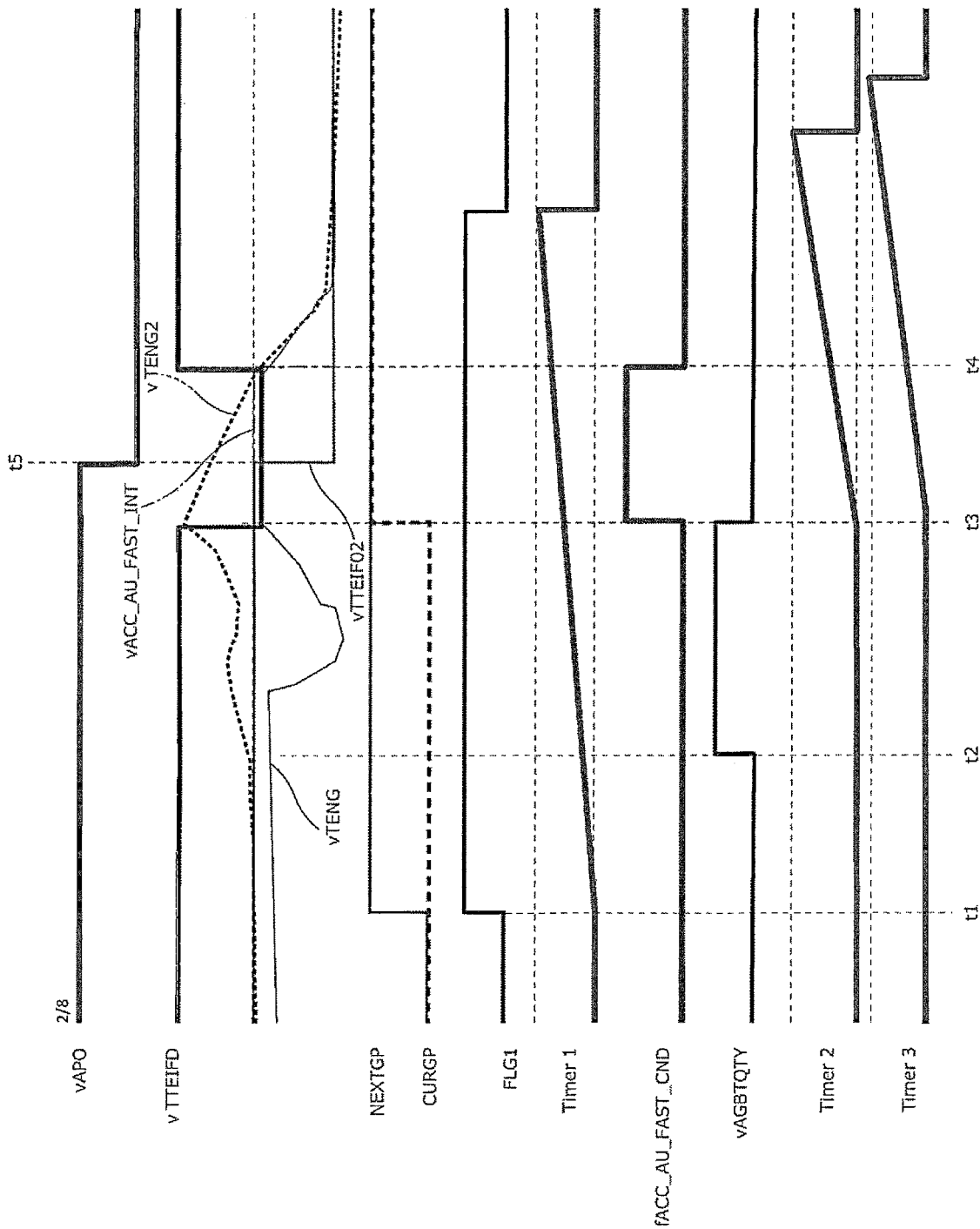
FIG. 4 is a time chart in one example in which the accelerator opening degree is decreased during the control.

Next, FIG. 4 shows a time chart when the accelerator opening degree vAPO is decreased during the second torque down control. The operations during time t1-t3 are identical to those of the above-described example of FIG. 3. When the predicted torque vTENG2 at time t3 at which the first torque down control is finished is equal to or greater than the target torque vTTEIF02 by the predetermined torque, the ignition timing retard as the second torque down control is started. The accelerator opening degree vAPO operated by the driver is a relatively small constant opening degree (for example, ⅔) until the second torque down control is started. However, the accelerator opening degree vAPO is decreased to, for example, a value near the full closing at the time t5 after the second torque down control is started. The target torque vTTEIF02 is decreased in accordance with the decrease of the accelerator opening degree vAPO as shown in the drawing.

On the other hand, the end judgment torque vACC_AU_FAST_INT is a value obtained by storing and holding the value of the target torque vTTEIF02 at the start timing (time t3) of the second torque down control. Accordingly, the end judgment torque vACC_AU_FAST_INT is not influenced by the decrease of the target torque vTTEIF02 at time t5. In the example of FIG. 4, the difference between the predicted torque vTENG2 and the end judgment torque vACC_AU_FAST_INT becomes equal to or smaller than the predetermined torque at time t4, one of the end conditions which are the OR conditions is satisfied. With this, the flag fACC_AU_FAST_CND is reset. Accordingly, the ignition timing retard as the second torque down control is finished. Besides, in the example of FIG. 4, the timer Timer2 and the timer Timer3 do not reach, respectively, the predetermined values. Therefore, these are not acted as the end conditions.

The end judgment torque vACC_AU_FAST_INT is provided for handling the decrease of the target torque vTTEIF02 due to the decrease of the accelerator opening degree vAPO, and so on during the second torque down control. That is, when the target torque vTTEIF02 is decreased, the difference between the predicted torque vTENG2 and the target torque vTTEIF02 is increased. With this, the end of the second torque down control is unnecessarily delayed. Accordingly, the target torque vTTEIF02 at the start (time t3) of the second torque down control is stored and held as the end judgment torque vACC_AU_FAST_INT. The second torque down control is finished when the predicted torque vTENG2 is closer to this end judgment torque vACC_AU_FAST_INT.

Figure 5:
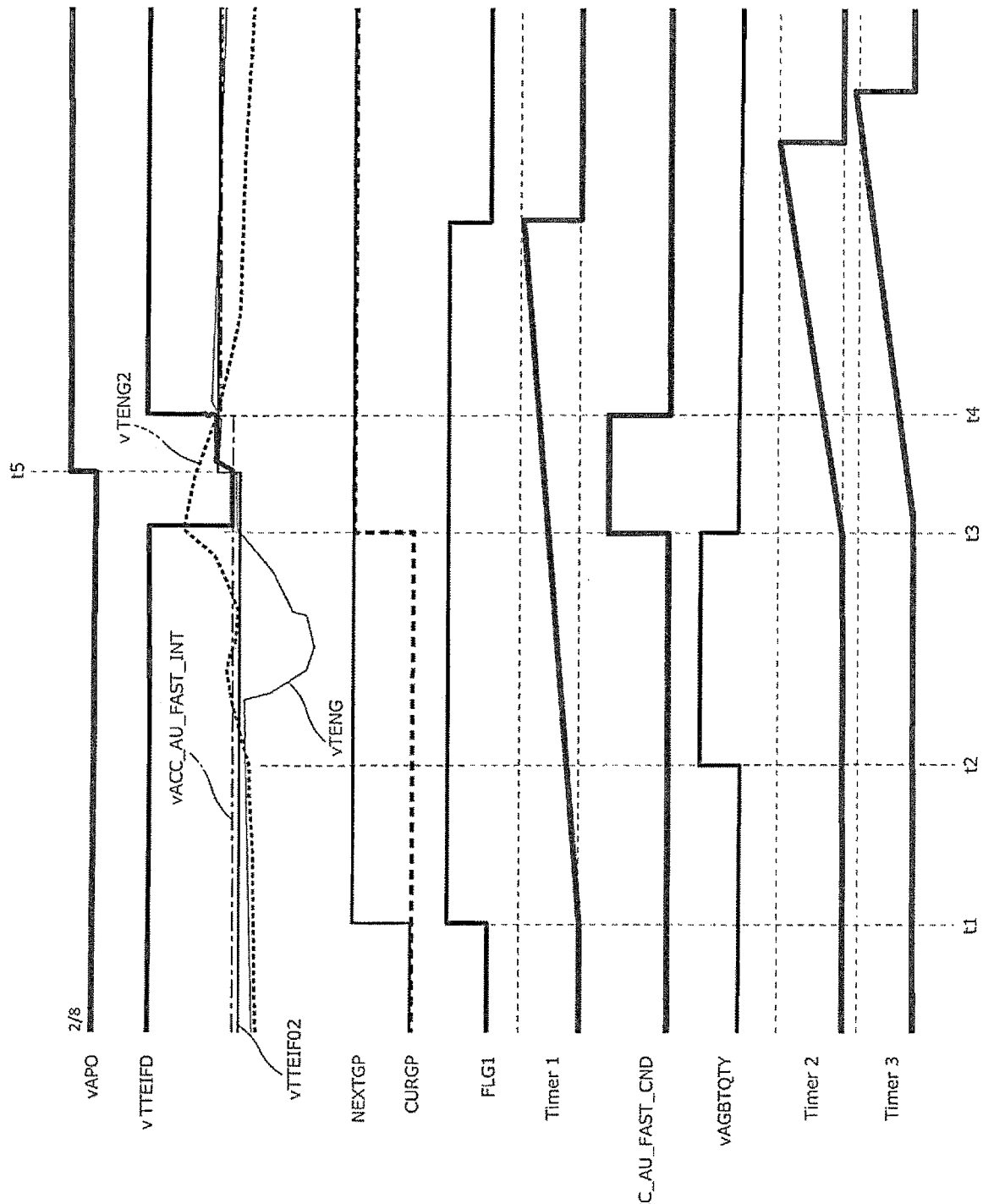
FIG. 5 is a time chart in one example in which the accelerator opening degree is increased during the control.

Next, FIG. 5 shows a time chart when the accelerator opening degree vAPO is increased during the second torque down control. The operations during time t1-t3 are identical to those in the above-described example of FIG. 3. The predicted torque vTENG2 is equal to or greater than the target torque vTTEIF02 by the predetermined torque at time t3 at which the first torque down control is finished. With this, the ignition timing retard as the second torque down control is started. The accelerator opening degree vAPO operated by the driver is the relatively small constant opening degree (for example, ⅔) until the second torque down control is started. However, the accelerator opening degree vAPO is varied to the greater opening degree at time t5 after the start of the second torque down control. The target torque vTTEIF02 is increased in accordance with this increase of the accelerator opening degree vAPO, as shown in the drawing.

The end operations of the second torque down control when the accelerator opening degree vAPO is increased as shown in FIG. 5 are basically identical to those in the example of FIG. 3. That is, the difference between the predicted torque vTENG2 and the target torque vTTEIF02 becomes equal to or smaller than the predetermined torque at time t4. One of the end conditions which are the OR conditions is satisfied. The flag fACC_AU_FAST_CND is reset. With this, the ignition timing retard as the second torque down control is finished. Besides, in the example of FIG. 5, the timer Timer2 and the timer Timer3 do not reach, respectively, the predetermined values at time t4. Accordingly, these are not functioned as the end condition. Besides, "vACC_AU_FAST_INT" is not equal to "vTTEIF02" before t5 and after t4 in FIG. 5 in consideration of the visibility of the drawing. However, these are actually identical to each other.

Hereinabove, one embodiment of the present invention is explained. However, the present invention is not limited to the above-described embodiment. Various modifications are applicable. For example, the predicted torque vTENG2 may be estimated from the parameters indicative of the driving conditions of the internal combustion engine which are other than the intake air amount. Moreover, the start condition and the end condition of the second torque down control may be appropriately varied. The present invention is widely applicable to the internal combustion engine which includes the turbocharger, and which is connected to the stepped automatic transmission.

The invention claimed is:

1. A control method for an internal combustion engine which includes a turbocharger, and which is connected to a stepped automatic transmission, the control method comprising:
    judging whether or not an upshift of the automatic transmission is performed;
    performing a first torque down control by an ignition timing retard of the internal combustion engine during the upshift;
    judging whether or not a predicted torque estimated from a driving condition of the internal combustion engine is greater than a target torque at an end of the upshift; and
    performing a second torque down control by the ignition timing retard of the internal combustion engine when the predicted torque is greater than the target torque.

2. The control method for the internal combustion engine as claimed in claim 1, wherein a waist gate valve of the turbocharger is maintained to at least a partially closed state during the upshift.

3. The control method for the internal combustion engine as claimed in claim 2, wherein the waist gate valve of the turbocharger is maintained to a fully closed state during the upshift.

4. The control method for the internal combustion engine as claimed in claim 1, wherein the second torque down control is started when the predicted torque is equal to or greater than the target torque by a predetermined torque.

5. The control method for the internal combustion engine as claimed in claim 1, wherein the second torque down control is finished when a difference between the predicted torque and the target torque becomes equal to or smaller than a predetermined torque after the start of the second torque down control.

6. The control method for the internal combustion engine as claimed in claim 1, wherein the target torque at the start of the second torque down control is stored as an end judgment torque; and the second torque down control is finished when a difference between the predicted torque and the end judgment torque becomes equal to or smaller than a predetermined value after the start of the second torque down control.

7. The control method for the internal combustion engine as claimed in claim 1, wherein an elapsed time period from the end of the upshift is measured; and the second torque down control is finished when the elapsed time period reaches a predetermined time period.

8. A control device for an internal combustion engine which includes a turbocharger, and which is connected to a stepped automatic transmission, the control device comprising:
    a shift judging section configured to judge whether or not an upshift of the automatic transmission is performed;
    a torque predicting section configured to estimate a torque of the internal combustion engine from a driving state of the internal combustion engine, and to output a predicted torque; and
    a torque down control section configured to perform a first torque down control by an ignition timing retard of the internal combustion engine during the upshift, and to perform a second torque down control by the ignition timing retard of the internal combustion engine when the predicted torque is greater than a target torque at an end of the upshift.

9. A control method for an internal combustion engine which includes a turbocharger, and which is connected to a stepped automatic transmission, the control method comprising:
    performing a first torque down control by an ignition timing retard of the internal combustion engine during an upshift of the automatic transmission; and
    performing a second torque down control by the ignition timing retard to suppress an excessive torque of the internal combustion engine which is lately generated due to an increase of a supercharging pressure due to an increase of an exhaust gas temperature by the torque down control.

10. The control method for the internal combustion engine as claimed in claim 9, wherein a period during which the second torque down control is performed includes at least a timing after a period of the upshift.

* * * * *